United States Patent [19]

Shigemi

[11] Patent Number: 5,287,696
[45] Date of Patent: Feb. 22, 1994

[54] PULSE-JET ATOMIZER MECHANISM FOR SPRINKLING CHEMICALS

[76] Inventor: Toyoki Shigemi, 921-27, Yamanokami, Tatomi-chou, Nakakoma-gun, Yamanashi-ken, Japan

[21] Appl. No.: 12,917

[22] Filed: Feb. 3, 1993

[30] Foreign Application Priority Data

Sep. 16, 1992 [JP] Japan .................. 4-246113

[51] Int. Cl.⁵ .................................................. B05B 7/28
[52] U.S. Cl. ........................... 60/39.141; 60/39.77; 239/77; 239/129
[58] Field of Search .......... 60/39.76, 39.77, 39.79, 60/39.8, 39.81, 247, 249, 39.141, 39.142; 239/77, 78, 129

[56] References Cited

U.S. PATENT DOCUMENTS

| | | | |
|---|---|---|---|
| 2,715,436 | 8/1955 | Lafferentz et al. | 60/39.77 |
| 2,959,214 | 11/1960 | Durr et al. | 60/39.77 |
| 3,151,454 | 10/1964 | Curtis | 60/39.77 |
| 3,788,547 | 1/1974 | Stahl et al. | 239/129 |
| 3,855,148 | 12/1974 | Locher et al. | 60/39.77 |
| 3,993,582 | 11/1976 | Curtis et al. | 239/77 |
| 4,343,719 | 8/1982 | Stevens et al. | 239/129 |
| 4,811,901 | 3/1989 | Stevens et al. | 239/129 |

Primary Examiner—Louis J. Casaregola
Attorney, Agent, or Firm—Steven M. Rabin

[57] ABSTRACT

An atomizer mechanism includes a pulse-jet engine for atomizing chemicals, an air-fuel mixture supply unit, and an engine starter. The air-fuel mixture supply unit includes a precombustion chamber that communicates with the combustion chamber, a collecting valve, and a carburetor for supplying atomized fuel to the precombustion chamber through the valve. The engine starter includes a compressed air inflow passage for carrying compressed air into the precombustion chamber and toward the valve, without passing through the valve. The engine starter also includes a manual pump which pressurizes fuel and a fuel supply passage. The fuel supply passage is connected to the compressed air inflow passage upstream of the precombustion chamber. The fuel is thereby supplied to the compressed air inflow passage, where it is atomized and directed into the precombusion chamber for ignition to start the engine.

9 Claims, 4 Drawing Sheets

PULSE-JET ATOMIZER MECHANISM FOR SPRINKLING CHEMICALS

BACKGROUND OF THE INVENTION

Prior Art

FIG. 5 is a schematical drawing of a conventional type atomizer mechanism for sprinkling chemicals.

In this figure, the reference numeral 10 designates a pulse-jet engine, and reference numeral 20 designates a combustible air-fuel mixture supply unit. Reference numeral 40A designates an engine starter, and reference numeral 60 designates is a chemical supply unit.

When the combustible air-fuel mixture containing the air and fuel (gasoline) is exploded by means of a glow coil 12 for ignition in a combustion chamber 11 of the pulse-jet engine 10, chemicals such as aqueous insecticide supplied from the chemical supply unit 60 are atomized by the use of high speed gas generated by the explosion. Also, the combustible air-fuel mixture supply unit 20 supplies the combustible air-fuel mixture to the combustion chamber 11 of the pulse-jet engine 10.

Describing the conventional mechanism more concretely, the pulse-jet engine 10 comprises a combustion chamber 11 as described above, an engine exhaust cylinder 13, for discharging combustion gas at high speed as a high temperature gas, through a throttling area from the combustion chamber 11, an outer cylinder 14 to cover the outer surface of the engine exhaust cylinder 13, and a cooling air suction cylinder 15 for sucking cooling air from external atmosphere and for guiding it into the outer cylinder 14.

Also, the combustible air-fuel mixture supply unit 20 comprises a precombustion chamber 21, a collecting valve 25 and a carburetor 31.

The precombustion chamber 21 is communicated with the combustion chamber 11 of the pulse-jet engine 10 through a communication pipe 22 and supplies the combustible air-fuel mixture generated in the carburetor to said combustion chamber 11.

The carburetor 31 mixes the air and the fuel (gasoline) in a predetermined ratio and atomizes the mixture. It sucks the fuel from a fuel tank 51 through a fuel supply pipe 52 using a pressure wave (impulse) from the precombustion chamber 21 supplied through a pressure pipe 23, atomizes the fuel and injects into the precombustion chamber 21 through a collecting valve 25.

The collecting valve 25 has a valve of the structure already known and comprises a valve seat 27, made of aluminum and provided with a plurality of penetrating holes positioned along a circle at a predetermined spacing, and a flexible diaphragm 26, made of stainless steel and provided with plate valves, the plate valves being elastically deformed by pressure change in the precombustion chamber 21 and capable of opening or closing each of the penetrating holes of the valve seat 27. That is, when the pressure in the precombustion chamber 21 is increased, the flexible diaphragm 26 of the collecting valve 25 is deformed, and the plate valves close the penetrating holes of the valve seat 27 (valve closed). When the pressure in the precombustion chamber 21 is decreased, the diaphragm 26 of the collecting valve 25 is deformed, and the plate valves open the penetrating holes of the valve seat (valve opened).

The engine starter 40A starts the pulse-jet engine 10 and is normally designed to be of a pneumatic pressure type. More concretely, the engine starter 40A comprises a manual air pressure pump (not shown), an ignition plug 45 for igniting the combustible air-fuel mixture, causing it to explode in the precombustion chamber 21, and an ignition coil 46 to provide power for the plug 45.

A prime pump 41A pressurizes fuel from the fuel tank 51 as it is sucked through pipe 43, carburetor 31 and fuel pipe 52 by manual operation and can inject it into an air passage 33 of the carburetor, via a pipe 42. The air pressure pump, by manual operation discharges air from the right inner wall of the precombustion chamber 21 in FIG. 5 through a pulse pressure pipe 63 and a ventilation pipe 29 as further described below and can atomize the fuel supplied through the collecting valve 25.

By manually operating the prime pump 41A and the air pressure pump as described above, fuel can be supplied into the precombustion chamber 21 as atomized gas through the air passage 33 of the carburetor 31 and the collecting valve 25. The atomized fuel is ignited by the plug 45 heated by the ignition coil 46, and as the result, the engine 10 is started. Then, the glow coil 12 is heated up, and the carburetor 31 repeatedly injects the fuel by pulse pressure through the pressure pipe 23. Thus, normal operation of the pulse-jet engine 10 is performed.

On the other hand, the chemical supply unit 60 comprises a tank 61, a supply pipe 62, the pulse pressure pipe 63, and a chemical discharger 64. Pressurized by the pulse pressure in the precombustion chamber 21 in normal operation, the chemical (such as aqueous insecticide) is injected and supplied into the engine exhaust cylinder 13 from the chemical discharger 64. The chemical injected from the chemical discharger 64 is gasified and cooled down by external air inside a cooling chamber 16 formed in the outer cylinder 14. As the result, the chemical is turned to fumes containing particles of size 1 to 0.5 μm or less.

Among users of the atomizer mechanism as described above, there are strong demands to make it easier to handle, while the hardest bottleneck to meeting such demands is the starting of the pulse-jet engine 10.

Specifically, the engine 10 is started by manual operation of the air pressure pump and the prime pump 41A connected to the ventilation pipe 29, and the start-up is sometimes not smooth because the air and the fuel are not mixed at a predetermined ratio and the fuel often becomes too dense due to inadequate stroke or speed of the air pressure pump.

To prevent excessive condensation of the fuel, a compressor is connected to the ventilation pipe 29 instead of the air pressure pump and the air, under a predetermined pressure, is sent in a horizontal direction at a predetermined flow rate into the precombustion chamber 21. With such an arrangement, however, the fuel injected into the carburetor 31 by the prime pump 41A often attaches to on the collecting valve 25 in large quantity when it passes through the valve 25, and the fuel is supplied to the precombustion chamber 21 in a so-called dripping state from the collecting valve 25. As the result, the plug 45 is often moistened and is unable to start. Because the holding position of the entire system varies according to the operator, it is very difficult to start in a rapid and reliable manner.

SUMMARY OF THE INVENTION

It is an object of the present invention to provide an atomizer mechanism for sprinkling chemicals, which can start a pulse-jet engine in a rapid and reliable manner and is easy to handle.

The atomizer mechanism for sprinkling chemicals according to the present invention comprises a pulse-jet engine, which atomizes chemicals supplied from a chemical supply unit using high speed exhaust gas generated through explosion of a combustible air-fuel mixture in a combustion chamber, a combustible air-fuel mixture supply unit containing a precombustion chamber that communicates with the combustion chamber of the pulse jet engine, and also containing a carbureter for supplying the atomized fuel, through a collecting valve, into said precombustion chamber, and an engine starter having a manual pump for pressurizing fuel and for supplying the atomized fuel into the precombustion chamber by a pumping operation when the pulse-jet engine is started, and for igniting said atomized fuel, whereby a compressed air inflow passage, for injecting compressed air toward the collecting valve, is connected to the precombustion chamber, and a fuel supply passage for the starting operation, which can supply the fuel pressurized by the manual pump, is connected to the middle of the compressed air inflow passage, that is, upstream of the connection of the later to the precombustion chamber.

Said combustion chamber is provided with igniting means in such manner that the igniting means can be removed to outside through a mounting fixture.

Further, said chemical supply unit comprises a tank for chemicals and a supply pipe connecting said chemical tank and a chemical discharger of the pulse-jet engine. An end of said supply pipe closer to the tank is formed as a flexible hose, on which a chemical intake portion is mounted, a fuel supply pipe for connecting said combustible air-fuel mixture supply unit and the fuel tank is provided, and an end of said fuel supply unit closer to the fuel tank is formed as a flexible hose, on which the fuel intake portion is mounted.

In the present invention, when the pulse-jet engine is started, compressed air is injected toward the collecting valve into the precombustion chamber through the compressed air inflow passage. When the fuel is pressurized by manual operation of the manual pump, the pressurized fuel is forced into the compressed air inflow passage through the fuel supply passage for the starting operation. Because the fuel is not supplied through the collecting valve, dripping of fuel due to the fuel attached to the collecting valve does not occur. The fuel thus sent in is atomized by the compressed air continuously flowing in the compressed air inflow passage under a constant pressure and at a constant flow rate, and it is sent into the precombustion chamber and is ignited.

In this case, imperfect ignition does not occur because the fuel supplied the precombustion chamber is sufficiently atomized. Because of the structure of the collecting valve, the valve can be more perfectly closed when fuel is attached to it to some extent. Smooth valve closure is ensured because a part of the atomized fuel injected from the compressed air inflow passage is attached to the collecting valve.

Since no dripping of fuel occurs as in the past, the pulse jet engine can be started more rapidly and reliably, and it is also easy to handle.

The combustion chamber is provided with igniting means through a mounting fixture so that it can be removed to outside. This assures perfect and easy cleaning of the igniting means.

Further, even when the chemical tank (fuel tank) is tilted, due to position in which the atomizer is held and the position of the chemical (fuel) is changed, each of the flexible hoses is deformed by weight of the chemical intake unit (fuel intake unit), and these intake units are immersed continuously in the chemical (fuel). As the result, the chemical (fuel) can be smoothly supplied to the chemical discharger (carburetor) regardless of the position in which the atomizer is held.

According to the present invention, the pulse-jet engine can be started much more rapidly, and reliably and it becomes much easier to handle because a compressed air inflow passage for injecting compressed air toward the collecting valve is connected to the precombustion chamber and also because the fuel supply passage, for supplying fuel pressurized by the manual pump during the starting operation, is connected to the middle of the compressed air inflow passage, that is, upstream of the connection of the latter to the precombustion chamber.

Also, because the combustion chamber is provided with igniting means through a mounting fixture so that it can be removed to the outside, the igniting means can be easily taken out of the combustion chamber and cleaned up. As the result, it is possible to start the pulse jet engine much more reliably and to handle it in an easier manner.

Further, an end of the supply pipe of the chemical supply unit closer to the tank is formed as a flexible hose on which the chemical intake unit is mounted, and an end of the fuel supply pipe closer to fuel tank is formed as a flexible hose on which the fuel intake unit is mounted. As the result, even when the chemical tank (fuel tank) is tilted due to the position in which the atomizer is held and the position of the chemical (fuel) is changed, each of the flexible hoses is deformed by the weight of the chemical intake unit (fuel intake unit) and is continuously immersed in the chemical (fuel). Thus, the chemical (fuel) can be sucked from each of the intake units and can be smoothly sent to the chemical discharger (carburetor) of the engine. This makes it possible to start and handle the pulse jet engine in a much more reliable and easier manner regardless of the position in which the atomizer is held.

Figure 1:
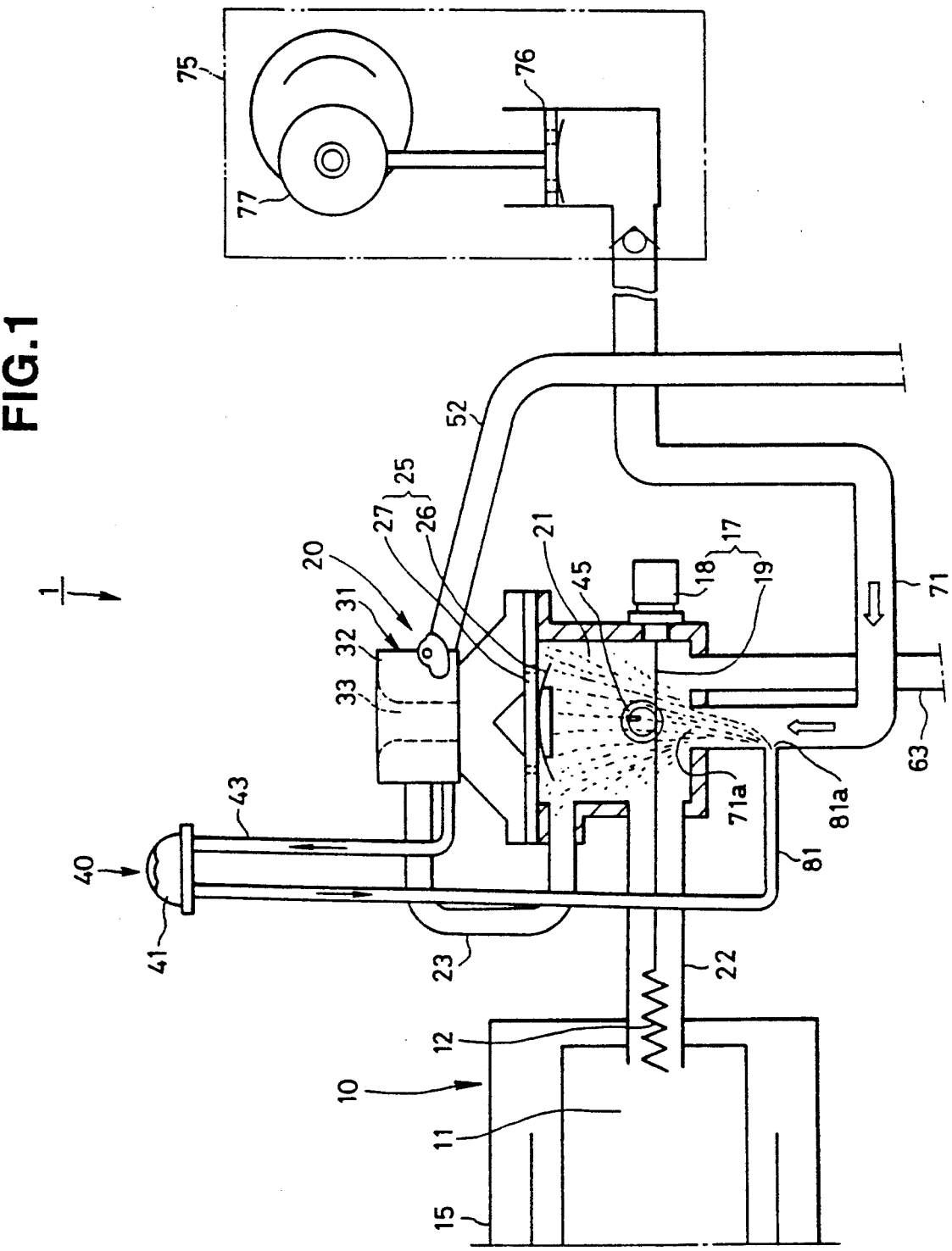
FIG. 1 is a drawing of essential part of an embodiment of the present invention.

In the figures, the reference numeral 10 designates a pulse-jet engine, 11 a combustion chamber of the pulse jet engine, 20 a combustible air-fuel mixture supply unit, 21 a precombustion chamber of the combustible air-fuel mixture supply unit, 40 an engine starter, 60 a chemical supply unit, 71 a compressed air inflow passage, and 81 a fuel supply passage for the starting operation.

DESCRIPTION OF THE PREFERRED EMBODIMENT

In the following, an embodiment of the present invention will be described in connection with the drawings.

Figure 2:
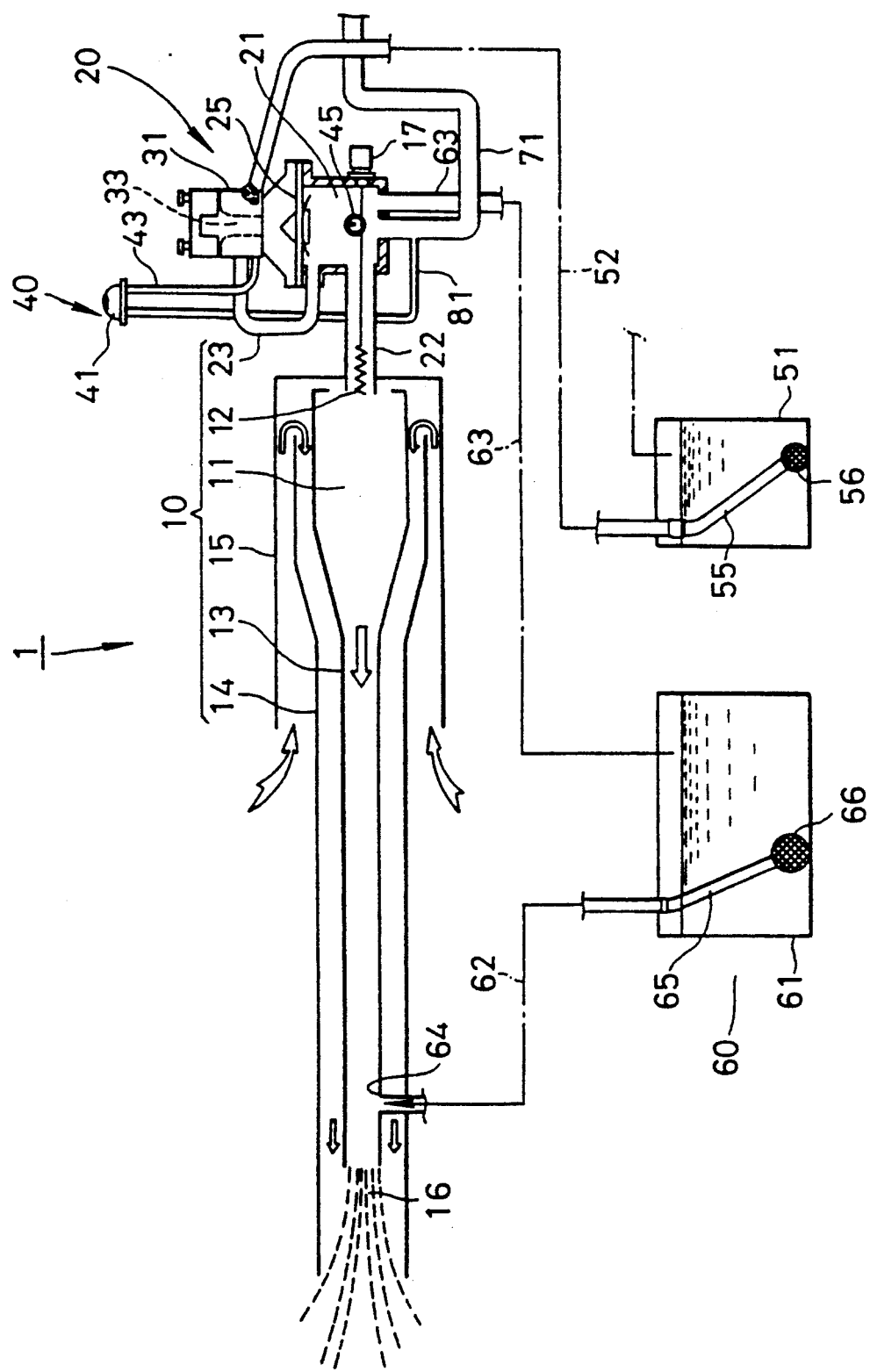
FIG. 2 is a drawing of the entire arrangement of an embodiment of the invention.
Figure 5:
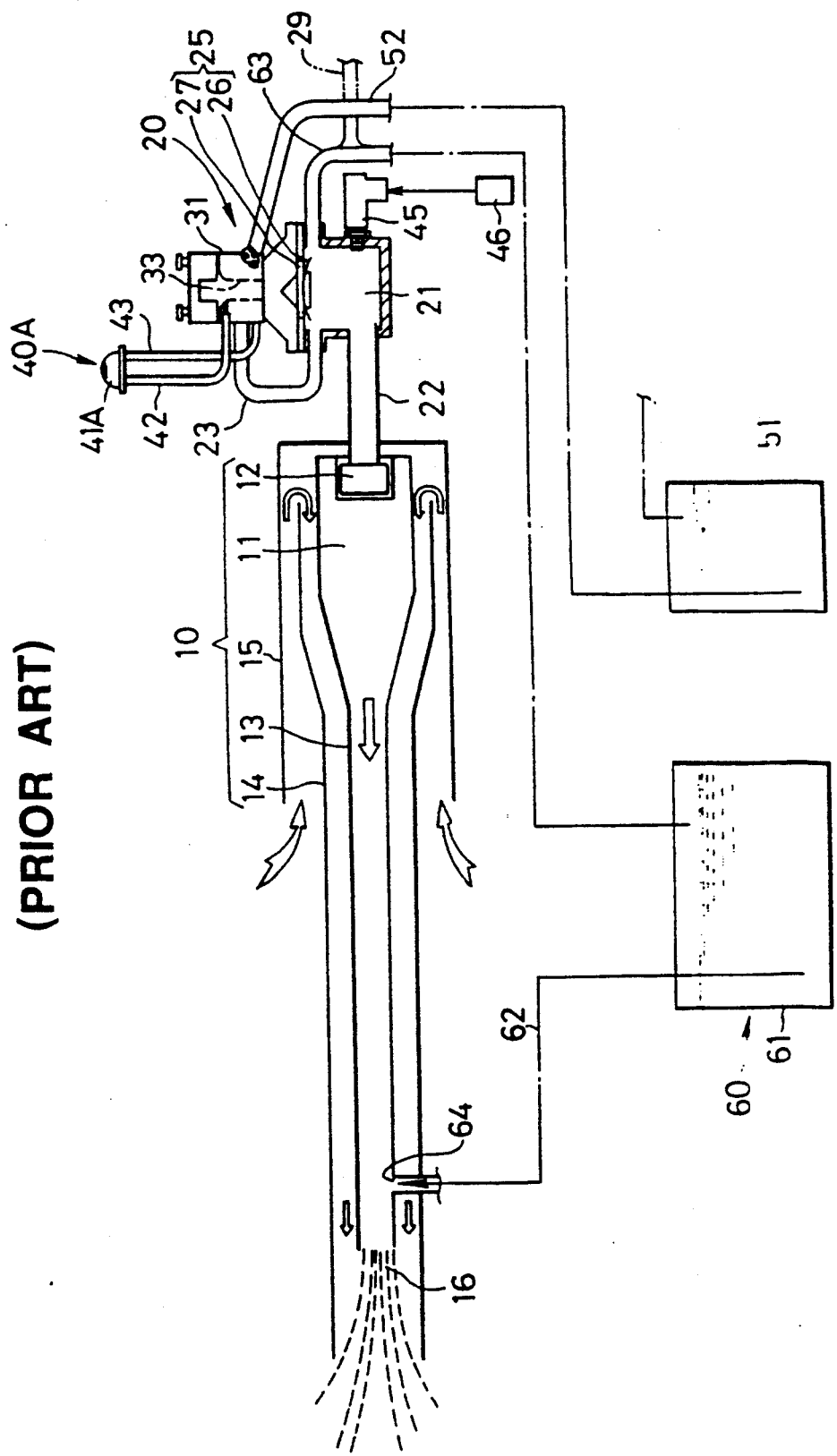
FIG. 5 is a drawing of approximate arrangement of a conventional type atomizer mechanism.

As shown in FIG. 1 and FIG. 2, the atomizer mechanism 1 for sprinkling chemicals is the same in basic arrangement [i.e. pulse jet engine 10, combustible air-fuel mixture supply unit 20 (precombustion chamber 21, carburetor 31), engine starter 40, and chemical supply unit 60] as in a conventional type apparatus (FIG. 5). In addition, a compressed air inflow passage 71, for injecting compressed air toward the collecting valve 25, is connected, at an opening 71a, to the precombustion chamber 21. The opening 71a and the collecting valve 25 are provided in respective opposite sides of the precombustion chamber 25. Fuel supply passage 81, for the starting operation, that supplies fuel pressurized by a manual pump 41, is connected to the middle of the inflow passage 71 (upstream of the opening 71a).

The combustion chamber 11 is provided with a glow coil 12, serving as an igniting means of the pulse-jet engine 10, through a mounting fixture 17 mounted to a wall of the fuel supply unit so that the glow coil can be withdrawn to outside of the mechanism 1. Inner walls of the coil 12 and a communication pipe 22 are designed in such manner that these can be cleaned up rapidly and reliably.

Figure 4:
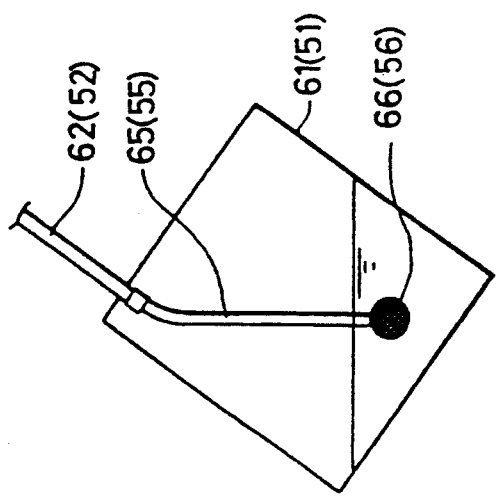
FIG. 4 is a drawing illustrating a chemical tank or fuel tank of an embodiment of the invention in a tilted state.

Further, an end of each of a chemical supply pipe 62 for and a fuel supply pipe 52, respectively closer to the chemical supply tank 61 and the fuel supply tank 51, formed as respective flexible hoses 65, 55, on which intake units, each 66, 56, serving as a strainer and a weight are mounted. As the result, even when each of the tanks 61, 51 is tilted as shown in FIG. 4, each of the hoses (65, 55) is deformed by the weight of the intake units 66, 56, and chemical or fuel can be sucked from each of the intake units 66, 56 and can be smoothly sent, respectively, to the chemical discharger 64 and the carburetor 31.

The same parts as in the conventional type (FIG. 5) are designated to by the same symbols, and a detailed description thereof is not given here.

First, a glow coil 12 of the pulse jet engine 10 is mounted in a combustion chamber 11 through a mounting fixture 17 so that it can be withdrawn to the outside. The coil mounting fixture 17 comprises a support lead 19 and a bolt unit 18. One end of the support lead 19 is connected to the glow coil 12 and extends in a transverse direction within the precombustion chamber 21 and the communication pipe 22, as shown in FIG. 1. The bolt unit 18 holds the other end of the support lead 19 and is fixed by screws on a side wall of the precombustion chamber 21, through a sealing member.

Figure 3:
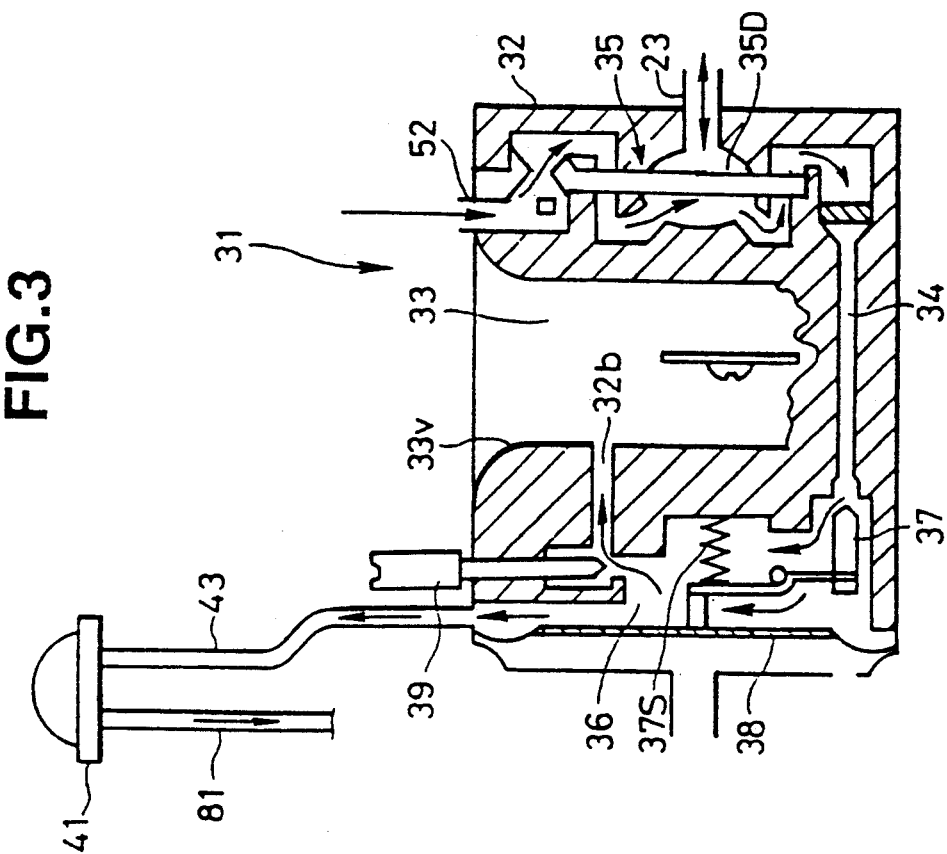
FIG. 3 is a drawing of approximate arrangement of a carburetor of an embodiment of the invention.

As shown in FIG. 3, a carburetor 31 comprises a main unit 32 within which there are provided an air passage 33, a fuel filling unit 36, and a fuel pump 35. (FIG. 3 is a schematical drawing provided to facilitate explanation of the carburetor 31 to.) Main unit 32 has a venturi 33v and is provided with the air passage 33, which communicates with the precombustion chamber 21 through the collecting valve 25. A fuel supply pipe 52 is connected to the fuel filling unit 36 via a fuel supply passage 34. One side of the fuel filling unit 36 is formed by a metallic diaphragm 38.

Therefore, when fuel fills this fuel filling unit 36, the metallic diaphragm 38 is deformed outwardly by pressure of the fuel against the resilient force of a spring 37S and closes an inlet needle valve 37. As the result, the fuel supply to the fuel filling unit 36 is stopped. On the other hand, when the fuel in the fuel filling unit 36 is sucked by the air flowing in the air passage 33 via a fuel outflow passage 32b, the metallic diaphragm 38 is deformed inwardly by the suction force and opens the inlet needle valve 37. Thus, the fuel supply to the fuel filling unit 36 is started again, and a constant quantity of fuel at all times fills the fuel filling unit 36.

A fuel pump 35 is provided at the middle of the supply passage 34. The fuel pump 35 has a fuel pump diaphragm 35D. This diaphragm 35D acts in response to a pressure wave (impulse) from a pressure pipe 23 and sends the fuel into the fuel filling unit 36. A fuel regulating needle 39 is furnished between the fuel filling unit 36 and the fuel outflow passage 32b in such a manner that the cross-sectional area of the fuel flow can be increased or decreased.

The pump of the engine starter 40 is formed by a prime pump 41. By manually operating the prime pump 41, fuel can be sucked up from inside the fuel filling unit 36 of the carburetor 31 and can pressurize the fuel.

As shown in FIG. 1, the compressed air inflow passage. 71 is connected to the precombustion chamber 21, through the opening 71a, so that compressed air under a constant pressure and at a constant flow rate can be continuously injected toward the collecting valve 25 through the opening 71a. To the middle of the compressed air inflow passage 71, the fuel supply passage 81 for the starting operation, that supplies the fuel pressurized by the manual pump 41, is connected via an opening 81a.

Further, to one end of the compressed air inflow passage 71, a compressed air source 75, comprising an air pump 76 and an air pump motor 77, is connected. The fuel supply passage 81 for the starting operation is provided in such a manner that it directly connects to the prime pump 41 to the middle of the compressed air inflow passage 71.

As shown in FIG. 2, an end of the supply pipe 62 of the chemical supply unit 60 (the end closer to the tank 61) is formed as a flexible hose 65, and at the tip of the hose 65, a chemical intake unit 66, serving as a strainer and a weight, is mounted. Similarly, an end of the fuel supply pipe 52 closer to the fuel tank 51 is formed as a flexible hose 55, and at the tip of the hose 55, a fuel intake unit 56, serving as a strainer and a weight, is mounted.

As the result, even when the tank 61 (51) is tilted with respect to the chemical surface level (fuel level) due to the tilting of the entire atomizer 1, the flexible hose 65 (55) hangs vertically as shown in FIG. 4 by the weight of the chemical intake unit 66 (fuel intake unit 56) and is continuously immersed in the chemical (fuel). Thus, even when there is only a small quantity of chemical (fuel), the chemical (fuel) can be smoothly supplied to the chemical discharger 64 (carburetor 31) of the engine 10.

Next, description will be given on the operation of the present embodiment.

When the pulse-jet engine 10 is started, the compressed air source 75 is driven, and the generated compressed air is sent toward the collecting valve 25 through the compressed air inflow passage 71 and is injected into the precombustion chamber 21. Next, by manually operating the prime pump 41 under this condition, fuel is sucked from the fuel filling unit 36 of the carburetor 31 and is pressurized, and the pressurized fuel is sent into the compressed air inflow passage 71 through the fuel supply passage 81 for the starting operation. Since the fuel is not supplied through the collecting valve 25, dripping due to fuel attached to the collecting valve 25 does not occur. The fuel thus sent in is perfectly atomized by the compressed air under a constant pressure and at a constant flow rate continuously flowing in the compressed air inflow passage 71, and is injected from the opening 71a of the compressed air inflow passage 71 toward the collecting valve 25, and it is ignited by the plug 45.

In this case, imperfect ignition does not occur because the fuel supplied into the precombustion chamber 21 has been perfectly atomized. Because of its structure, the collecting valve 25 can carry out valve closure more reliably when fuel is attached to it to some extent. Since a part of the atomized fuel injected from the compressed air inflow passage 71 is attached on the collecting valve 25, smooth valve closure is ensured.

In the present embodiment, the compressed air inflow passage 71 for injecting compressed air toward the collecting valve 25 is connected to the precombustion chamber 21, and the fuel supply passage 81 for the starting operation for supplying fuel pressurized by the manual pump (prime pump 41) is connected to the middle of the compressed air inflow passage 71, it is possible to start the pulse jet engine 10 much more rapidly and reliably and to make it easier to handle.

Also, because the glow coil 12 of the pulse jet engine 10 is mounted on the combustion chamber 11 through the coil mounting fixture 17 so that it can be withdrawn to the outside, maintenance of the glow coil 12 can be performed much more easily than previously. Also, by removing the glow coil 12, it is possible to easily and reliably clean up the incompletely burned substances attached on inner wall of the communication pipe 22. As the result, the pulse-jet engine 10 can be started under more stable conditions.

The end of the supply pipe 62 of the chemical supply unit 60 closer to the tank 61 is formed as a flexible hose 65, on the tip of which the chemical intake unit 66 is mounted, and the end of the fuel supply pipe 52 closer to the fuel tank 51 is formed as a flexible hose 55, on the tip of which the fuel intake unit 56 is mounted. As the result, even when the tanks 61 and 51 are tilted, the hoses 65 and 55 are deformed as shown in FIG. 4 by the weight of the chemical intake unit 66 and fuel intake unit 56. This makes it possible to supply the chemical and fuel respectively to the chemical discharger 64 and the carburetor 31 of the engine 10 smoothly, even when there are only small quantities of the chemical and fuel. For this reason, it is possible to start the pulse-jet engine 10 in a reliable manner regardless of the position in which the atomizer much mechanism is held, and it is made easier to handle.

What is claimed is:

1. An atomizer mechanism for sprinkling chemicals, comprising a pulse jet engine, which atomizes chemicals supplied from a chemical supply unit using high speed exhaust gas generated through explosion, a combustible air-fuel mixture supply unit containing a precombustion chamber communicated with the combustion chamber of the pulse jet engine and a carburetor for supplying atomized fuel through a collecting valve into said precombustion chamber, and an engine starter having both a manual pump for pressurizing fuel and for supplying atomized fuel into the precombustion chamber by pump operation when the pulse jet engine is started, and first means for igniting said atomized fuel, characterized in that:

a compressed air inflow passage is connected between a compressed air source and said precombustion chamber, for injecting compressed air into the precombustion chamber, without the compressed air first passing through the collecting valve, such that the injection compressed air is projected toward the collecting valve from within the precombustion chamber, and a fuel supply passage for starting operation, which can supply the fuel pressurized by the manual pump, is connected to the middle of the compressed air inflow passage.

2. An atomizer mechanism for sprinkling chemicals according to claim 1, wherein said combustion chamber is provided with second igniting means through a mounting fixture so that the second igniting means can be withdrawn to outside by prior removal of only said fixture.

3. An atomizer mechanism for sprinkling chemicals according to claim 1, wherein said chemical supply unit comprises a tank for chemicals and a supply pipe connecting said chemical tank and a chemical discharger of the pulse jet engine, an end of said supply pipe closer to the chemical tank is formed as a flexible hose, on which a chemical intake unit is mounted, a fuel supply pipe for connecting said combustible air-fuel mixture supply unit and a fuel tank is provided, and an end of said fuel supply pipe closer to the fuel tank is formed as a flexible hose, on which a fuel intake unit is mounted.

4. An atomizer mechanism for sprinkling chemicals according to claim 2, wherein said chemical supply unit comprises a tank for chemicals and a supply pipe connecting said chemical tank and a chemical discharger of the pulse jet engine, an end of said supply pipe closer to the chemical tank is formed as a flexible hose, on which a chemical intake unit is mounted, a fuel supply pipe for connecting said combustible air-fuel mixture supply unit and a fuel tank is provided, and an end of said fuel supply pipe closer to the fuel tank is formed as a flexible hose, on which a fuel intake unit is mounted.

5. An atomizer mechanism according to claim 1, wherein said compressed air inflow passage is connected to said precombustion chamber through an opening in said precombustion chamber, said opening and said collecting valve on opposite sides of said precombustion chamber.

6. An atomizer mechanism, comprising:

a pulse-jet engine, for atomizing chemicals supplied thereto, said engine having a combustion chamber;
an air-fuel mixture supply unit, including a precombustion chamber communicating with said combustion chamber, a collecting valve and a carburetor for supplying atomized fuel to said precombustion chamber through said valve; and
means for starting said engine, including
means for supplying compressed air to said precombustion chamber, including a compressed air inflow passage connecting a source of compressed air to said precombustion chamber along a path which excludes said valve, said compressed air inflow passage inserting the compressed air into said precombustion chamber in a direction toward said valve,
a manual pump for pressurizing fuel provided thereto,
a fuel supply passage, connected to said compressed air inflow passage upstream of said precombustion chamber, for supplying the pressurized fuel from said manual pump to said compressed air inflow passage to atomize the pressurized fuel in said compressed air inflow passage and insert the atomized fuel into said precombustion chamber, and means for igniting the atomized fuel in the precombustion chamber.

7. An atomizer mechanism according to claim 6, wherein said precombustion chamber has opposite first and second sides, said first side having said valve, said second side having an opening, said compressed air inflow passage being connected to said precombustion chamber at said opening.

8. An atomizer mechanism according to claim 6, wherein said means for supplying compressed air to said precombustion chamber further comprises the source of compressed air, said compressed air inflow passage carrying the compressed air into said precombustion chamber at a constant flow rate and at a constant pressure.

9. An atomizer mechanism according to claim 6, wherein said air-fuel mixture supply unit further comprises a communication pipe connecting said precombustion chamber to said combustion chamber, said pulse-jet engine further comprising a glow coil and a fixture mounting said glow coil adjacent to said combustion chamber, said fixture including a bolt unit mounted to a wall of said precombustion chamber opposite said communication pipe, and a support lead, said support lead extending across said precombustion chamber and into said communication pipe, said support lead having opposite first and second ends, respectively connected to said bolt unit and said glow coil, so that said glow coil can be removed from said mechanism by demounting said bolt unit from said wall and withdrawing said support lead and said glow coil through said wall.

* * * * *